(12) United States Patent
Nene et al.

(10) Patent No.: US 7,890,527 B1
(45) Date of Patent: Feb. 15, 2011

(54) BACKUP SEARCH AGENTS FOR USE WITH DESKTOP SEARCH TOOLS

(75) Inventors: Atul Avinash Nene, Pune (IN); Shyam Prakash Velupula, Andhra Pradesh (IN); Mukul Kumar, Pune (IN); Ajit Vishnu Dhumale, Pune (IN); Anand Gopinath Das, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 107 days.

(21) Appl. No.: 11/239,824

(22) Filed: Sep. 30, 2005

(51) Int. Cl.
*G06F 7/00* (2006.01)
*G06F 17/30* (2006.01)

(52) U.S. Cl. ...................... 707/769; 707/770
(58) Field of Classification Search .............. None
See application file for complete search history.

(56) References Cited

U.S. PATENT DOCUMENTS

| | | | |
|---|---|---|---|
| 6,366,987 B1 * | 4/2002 | Tzelnic et al. | 711/162 |
| 6,880,008 B1 * | 4/2005 | Yoneda | 709/226 |
| 7,260,619 B2 * | 8/2007 | Yoneda | 709/219 |
| 2003/0035519 A1 * | 2/2003 | Warmus | 379/88.17 |
| 2003/0046313 A1 * | 3/2003 | Leung et al. | 707/204 |
| 2003/0093276 A1 * | 5/2003 | Miller et al. | 704/257 |
| 2003/0158831 A1 * | 8/2003 | Zaremba | 707/1 |
| 2003/0229705 A1 * | 12/2003 | Yohichiroh | 709/229 |
| 2004/0236801 A1 * | 11/2004 | Borden et al. | 707/204 |
| 2006/0161520 A1 * | 7/2006 | Brewer et al. | 707/3 |
| 2006/0218435 A1 * | 9/2006 | van Ingen et al. | 714/6 |
| 2006/0265385 A1 * | 11/2006 | Agrawal et al. | 707/10 |
| 2007/0043705 A1 * | 2/2007 | Kaushik et al. | 707/3 |

OTHER PUBLICATIONS

Dornfest, Rael, *Google Your Desktop*, O'Reilly Network, Oct. 14, 2004, http://www.oreillynet.com/lpt/a/5284.
*Backup Exec "Panther" Beta*, Symantec Corporation, May 2005, http://eval.veritas.com/downloads/van/be_panther_beta_overview.pdf.

* cited by examiner

*Primary Examiner*—Cam Y Truong
*Assistant Examiner*—Dung K Chau
(74) *Attorney, Agent, or Firm*—Campbell Stephenson LLP

(57) ABSTRACT

Various methods and systems for implementing agents that facilitate end user searches of a backup catalog via a desktop search tool are disclosed. One method involves: receiving a search request from a desktop search tool, which is configured for use by an end user of a backup system; searching a backup catalog, maintained by the backup system, in response to the search request; and providing a result of searching the backup catalog to the desktop search tool.

20 Claims, 4 Drawing Sheets

US 7,890,527 B1

BACKUP SEARCH AGENTS FOR USE WITH DESKTOP SEARCH TOOLS

FIELD OF THE INVENTION

This invention relates to backup systems and, more particularly, to searching a backup catalog.

DESCRIPTION OF THE RELATED ART

Backup systems are used to protect data against loss. Typically, a backup system includes software that periodically copies user data to a backup storage device (e.g., such as a tape drive). If data is lost (e.g., due to user error or device failure), the backed-up copy of the data can be retrieved from the backup storage device.

Historically, the retrieval of backed-up data has required an administrator to intervene on behalf of an end user. For example, if an end user wants to restore a file that was accidentally deleted, the end user must contact an administrator to request the file from backup. This request may not be handled immediately, since the administrator may already be busy with other tasks. Once the administrator has an opportunity to service the request, the administrator searches for the file on the backup storage device. There may be several different versions of the file, so the administrator may need to interact with the end user in order to determine which version of the file to restore. Once the appropriate version of the file has been selected, the administrator restores the file by copying the file from the backup storage device to a storage device that is accessible by the end user.

The process of having an administrator retrieve backed-up data on behalf of an end user is often time consuming and frustrating for both the administrator and the end user. First, the end user must wait until the administrator is available and has time to respond to backup requests. Then, the administrator must try to identify the appropriate version of the data to restore. This can require input from the end user, so the process can be delayed while the administrator attempts to contact the end user. As this example shows, improved techniques for restoring data from backups are desirable.

SUMMARY

Various embodiments of methods and systems for implementing agents that facilitate end user searches of a backup catalog via a desktop search tool are disclosed. In some embodiments, a method involves: receiving a search request from a desktop search tool, which is configured for use by an end user of a backup system; searching a backup catalog, maintained by the backup system, in response to the search request; and providing a result of searching the backup catalog to the desktop search tool.

In one embodiment, searching the backup catalog involves searching only the portion of the backup catalog that identifies data that the end user has permission to access. Searching the backup catalog can also involve searching an index corresponding to the backup catalog. The index identifies content included in one or more files that are identified in the backup catalog.

The result of searching the backup catalog can include information identifying one or more versions of a file, information identifying when each of the one or more versions of the file were backed up, and/or information identifying a backup device on which each of the one or more versions of the file is stored. The result of searching the backup catalog can be displayed to the end user, along with an option to restore each of the one or more versions of the file from a backup device.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1:
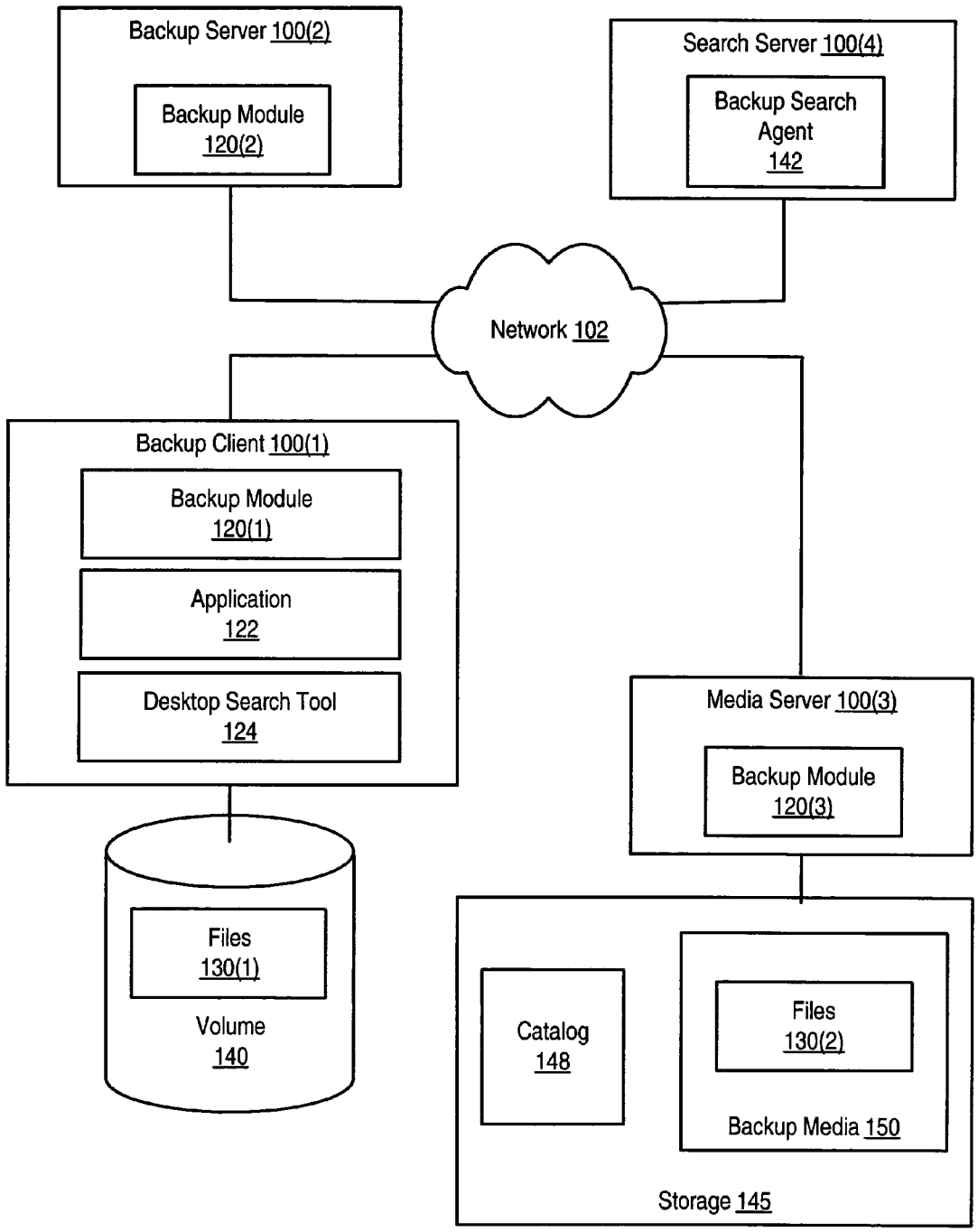
FIG. 1 is a block diagram of a data storage system, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a data storage system. The components in FIG. 1 can perform backups, full restores from backups, and selective restores of individual files from backups. FIG. 1 includes a backup client 100(1), a backup server 100(2), a media server 100(3), and a search server 100(4). Backup client 100(1), backup server 100(2), and media server 100(3) respectively include backup modules 120(1), 120(2), and 120(3). In one embodiment, backup modules 120(1)-120(3) are implemented using VERITAS NetBackup™ or VERITAS BackupExec™ software, available from Symantec Corporation of Cupertino, Calif.

Backup client 100(1), backup server 100(2), media server 100(3), and search server 100(4) are coupled by a network 102. Network 102 can include a WAN (Wide Area Network), such as the Internet, one or more LANs (Local Area Networks), and/or one or more SANs (Storage Area Networks). Network 102 can be implemented using various media, including coaxial cables, fiber optic cables, and wireless links.

Backup client 100(1) is a computing device that is coupled to a storage device, volume 140. Volume 140 is a physical or logical storage device that stores one or more files 130(1). Volume 140 can include one or more physical storage devices (e.g., in one embodiment, volume 140 is implemented on a storage array that includes several independent hard drives). An application (not shown) executing on backup client 100(1) can access (e.g., read and write) files 130(1) stored on volume 140. It is noted that in other embodiments, the information stored on volume 140 could be organized using data objects (e.g., database records, object-based storage, and the like) other than files.

As shown, backup client 100(1), backup server 100(2), and media server 100(3) each include backup and restore client software or agents implemented by backup modules 120(1)-120(3). Such agents typically receive instructions from backup server 100(2) and handle the extraction and placement of data for the backup client 100(1). Together, the backup and restore agents can backup and restore information stored on the client system.

Backup server 100(2) includes backup module 120(2), which initiates backups of client data. For example, backup module 120(2) can include a user interface that allows an administrator to specify when client data (such as file data 130(1), which is maintained by backup client 100(1)) should be backed up. Backup module 120(2) can also operate to control media server 100(3) and to interact with backup client 100(1).

Media server 100(3) implements backup module 120(3), which performs backup operations under direction from backup server 120(2). In this example, backup module 120(3) creates a backup by copying information the information stored on volume 140 to backup media 150 (backup media 150 is part of a pool of storage 145, which can include various types of storage devices, that is accessible to media server 100(3)). As shown, a point-in-time copy (files 130(2)) of files 130(1) can be stored on backup media 150. Backup media 150 can include sequential storage media such as magnetic tape as well as random access media such as hard disk drives, optical disks (e.g., CDs (Compact Discs) and DVDs (Digital Versatile Discs), and the like).

In one embodiment, modifications to files 130(1) are prevented while a backup is being created. In such an embodiment, a backup is performed by copying information directly from volume 140 to backup media 150. In other embodiments, a point-in-time copy (e.g., a copy-on-write snapshot, a mirror-breakoff snapshot, or the like) of the information stored on volume 140 is first created, and the backup is performed by copying the information in the point-in-time copy to backup media 150. Each backup can be a full backup (e.g., a complete copy of all files and other information stored on volume 140) or an incremental backup (e.g., a partial copy, which includes only the files and other information that have been modified since the last backup was created).

Backup client 100(1) implements a desktop search tool 124 that is configured for use by an end user of a backup system. Desktop search tool 124 is a tool that proves a user interface for accepting search queries from an end user (as used herein, an "end user" is a user, other than an administrator, whose data is backed up by a backup system). Desktop search tool 124 can be a component of backup module 120(1), a web browser, a third-party search tool (e.g., such as Google™ Desktop or Windows™ Desktop Search), or the like. An end user can enter a search query into desktop search tool 124 in order to search for a backed-up file or set of files. Desktop search tool 124 provides the search query to backup search agent 142, which performs the actual search. In some embodiments, the end user can also use desktop search tool to search various other sets of information (in addition to searching backed-up files), such as files 130(1), web pages available via the Internet, email, and the like.

An end user can enter a search query in a variety of different ways. For example, in one embodiment, a user can enter one or more keywords as a search query. These keywords can be used to search the names and/or content of backed-up files. A user can alternatively enter a natural language search query. Search queries can also include date ranges (e.g., to limit the search to files backed up before or after a certain date, or to files backed up between a range of dates), file type restrictions (e.g., to limit the search to files having certain extensions such as ".doc" files or ".txt" files), and the like.

If the desktop search tool can be used to search multiple different sources of information (e.g., such as email, web pages on the Internet, backups, local files, and the like), the desktop search tool can, in some embodiments, perform the requested search on all different sources of data. In other embodiments, desktop search tool 124 allows the end user to select (e.g., via a pull-down menu or other selection tool) which set of information to search. In such an embodiment, desktop search tool 124 only sends the search query to backup search agent 142 if the end user selects to search backed-up information (alternatively, the end user can be provided with a set of options that allow the user to select a particular search agent, such as backup search agent 142). If desktop search tool 124 is a third-party search tool (i.e., if desktop search tool is not part of the backup system), backup search agent 142 can be registered with the desktop search tool (e.g., by an administrator or end user), thus providing the desktop search tool with information needed to communicate with the backup search agent.

Search server 100(4) implements a backup search agent 142. Backup search agent receives search queries from desktop search tool 124 and, based on those queries, searches a backup catalog 148. The search queries received from desktop search tool 124 can include information that identifies the end user that initiated the search query.

Catalog 148 includes metadata that is generated by backup module 120(3) whenever a new backup is created. Catalog 148 identifies which files are included in each backup. Thus, catalog 148 can be searched to determine whether a particular file has ever been backed up. Catalog 148 can identify files by name and parent directory. Catalog 148 also identifies whether multiple versions of a file are available in a backup. In some embodiments, catalog 148 can provide other details about each file that has been backed up, such as the date of the backup, the size of the backed-up file, the location of the backed-up file, the time at which the backed-up file was last accessed and/or modified, the backup schedule associated with the backed-up file, and the backup policy associated with the backed-up file. If several different versions of a file have been backed up, the information in catalog 148 can be used to identify, for example, the most recently backed-up version of the file or the largest version of the file.

Catalog 148 can also identify the permissions and ownership of each backed-up file. This information can be used to determine which end users have access to a particular file.

Typically, catalog 148 is maintained in a proprietary format by backup modules 120(1)-120(3). Backup search agent 142 includes functionality that allows backup agent to either interpret the information in catalog 148 directly or to query the backup system (the term backup system is used to collectively refer to backup modules 120(1)-120(3)) for information in catalog 148. For example, in one embodiment, backup search agent 142 searches catalog 148 by searching catalog 148 directly (in this embodiment, backup search agent 142 includes functionality that is able to interpret the information in catalog 148, without communicating directly with the backup system).

In alternative embodiments, backup search agent 142 includes functionality that allows backup search agent 142 to communicate with the backup system via an interface (e.g., by sending appropriate requests to a command line interface (CLI) or application programming interface (API) provided by the backup system). In these embodiments, backup search agent 142 searches the catalog indirectly, by translating the search query received from desktop search tool 124 into one or more appropriate requests and sending those requests to the backup system. Thus, backup search agent 142 can indirectly search the catalog via interfaces provided by the backup system.

In still other embodiments, the backup system provides catalog 148 in web page format. In these embodiments, backup search agent 142 can include web search engine functionality for searching catalog 148.

When searching the catalog, backup search agent 142 restricts the search results to those files that the end user who initiated the search query has access to. For example, if the catalog indicates that the end user does not have permission to access a file that would otherwise satisfy the search query, the backup search agent 142 will not include that file in the search results. The function of restriction the end user's access based on permissions can be performed directly by backup search agent 142 (e.g., by interpreting metadata received from the backup system) or indirectly (e.g., the backup search agent can identify the end user that initiated the search query when communicating with the backup system via a CLI or API, and the backup system can restrict results to those files that the end user has permission to access).

After searching catalog 148, backup search agent 142 generates search results. The search results identify the backed-up files, if any, that satisfy the search query submitted by the end user. The search results can also include metadata (e.g., data identifying file characteristics such as size, creation time, and the like) about each of the identified backed-up files. Backup search agent 142 formats these results in a manner that is accepted by desktop search tool. For example, in one embodiment, backup search agent 142 returns results in the form of web pages (e.g., Hyper Text Markup Language (HTML) documents). The desktop search tool then displays these results to the end user. The results can identify one or more files and/or one or more versions of the same file. The results can also identify the size of each file, the date on which each file was backed up, the location of each file, and the like.

The system illustrated in FIG. 1 allows an end user to directly search for files that have been backed up, without the intervention of an administrator. This can greatly increase the efficiency of the backup process. For example, if an end user realizes that important information was accidentally deleted from a file, the end user can use desktop search tool 124 to quickly search for the prior version of the file that contained the deleted information. The information (provided by backup search agent 142 to desktop search tool 124) that is returned to the end user as a result of the query can identify where (e.g., by identifying a particular backup storage device) the prior version of the file is located. The end user can then provide this information to an administrator. Thus, the end user can provide the administrator with the exact version and location of the file to restore.

In some embodiments, backup search agent 142 returns information to desktop search tool 124 that enables the end user to directly restore a file from backup, without any administrator intervention at all. For example, if backup media 150 is a storage device array (as opposed to a collection of magnetic tapes) that is readily available, backup search agent 142 can return search results that include references (e.g., hypertext links) to files available on backup media 150. Desktop search agent 124 can display these references to the end user. The end user can select a reference corresponding to a file that the end user wishes to restore. In response to the end user's selection, a copy of the selected file can be transferred to the end user (e.g., such a copy could be transferred via network 102 and stored in volume 140). Thus, in an embodiment that permits end users to directly restore files identified in the search results, at least some restores can be performed without any administrator intervention.

It is noted that, while the functionality of backup modules 120(1)-120(3) has been divided into client, server, and media server functionality in the embodiment of FIG. 1, this functionality can be combined and/or rearranged in other embodiments. For example, in an alternative embodiment, backup module 120(2) can include media server functionality (provided by backup module 120(3) in FIG. 1), eliminating the need for a separate media server. Similarly, the functionality provided by backup modules 120(1), 12(2), and/or 120(3) can be combined and implemented on backup client 100(1), eliminating the need for separate backup and media servers 100(2) and 100(3).

Additionally, the functionality provided by desktop search tool 124, backup search agent 142, and backup modules 120(1)-120(3) can be combined and or rearranged in other embodiments. For example, in one alternative embodiment, backup search agent 142 is integrated with desktop search tool 124. Similarly, backup search agent 142 can be implemented on backup client 100(1).

Backup client 100(1), backup server 100(2), media server 100(3), and search server 100(4) can each include one or more computing devices configured to execute software implementing various applications (e.g., application 122, backup modules 120(1)-120(3), desktop search tool 124, backup search agent 142, and the like). In such embodiments, each computing device can include a workstation, personal computer, server, Personal Digital Assistant (PDA), cell phone, storage network switch, storage device, storage array controller, or any other device configured to execute software implementing such applications. Alternatively, each computing device can be implemented from hardware (e.g., logic devices such as programmable logic devices (PLDs), field programmable gate arrays (FPGAs), and the like) configured to perform the functions of such applications, or from a combination of hardware and software implementing the functionality of the applications.

Figure 2:
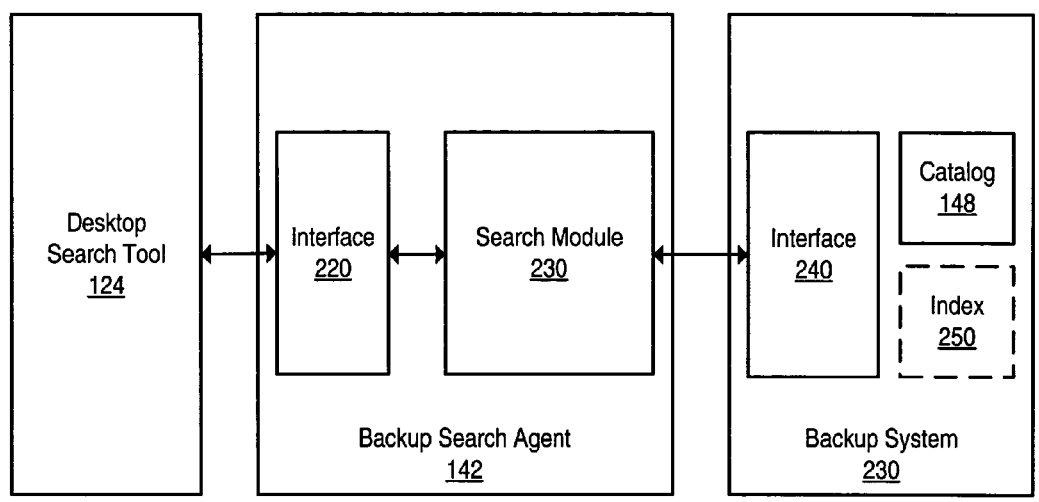
FIG. 2 is a block diagram of a system that includes a backup search agent, according to one embodiment of the present invention.

FIG. 2 illustrates more details of one embodiment of the backup search agent shown in FIG. 1. In the block diagram of FIG. 2, desktop search tool 124 communicates with backup search agent 142, which in turn communicates with backup system 230. Desktop search tool 124 can communicate with backup search agent 142 via a network. Alternatively, backup search agent 142 can be integrated with desktop search tool 124. Similarly, backup search agent 142 can communicate with backup system 230 via a network. Alternatively, backup search agent can be implemented on the same computing device as or even integrated with backup system 230.

Backup search agent 142 includes an interface 220, which is configured to receive search queries from desktop search tool 124 and to return search results to desktop search tool 124. Backup search agent 142 also includes a search module 230, which is configured to search catalog 148.

Backup system 230 (e.g., one or more of backup modules 120(1)-120(3) of FIG. 1) includes an interface 240, catalog 148, and an optional index 250. Interface 240 is an interface (e.g., a CLI or API) that provides access to information in catalog 148.

Index 250 is a search index that identifies content included in one or more backed-up files. For example, index 250 can identify backed-up files that have particular characteristics and/or that include a particular keyword. Index 250 can be used to search for particular backed-up files based on content. Index 250 can also index the metadata provided by catalog 148. Index 250 can be generated by backup system 230 or by backup search agent 142 (in the latter situation, index 250 may be stored locally to backup search agent 142). Index 250 is generated by searching the catalog in order to identify backed-up files, and then parsing those files and/or the catalog itself to generate the index.

In embodiments that provide an index 250, backup search agent 142 can search the catalog 148 indirectly by searching index 250. Since index 250 provides an index of the files identified in catalog 148, searching the index 250 can be more efficient (in terms of time and/or processing resources required) than searching catalog 148 directly. Since index 250 can also include information about the content of the backed-up files, the use of index 250 allows end users to search backups based on the content of the backed-up files. Even if backup search agent 142 does not generate index 250, backup search agent 142 can locally cache all or part of index 250 in order to increase search efficiency.

Figure 3:
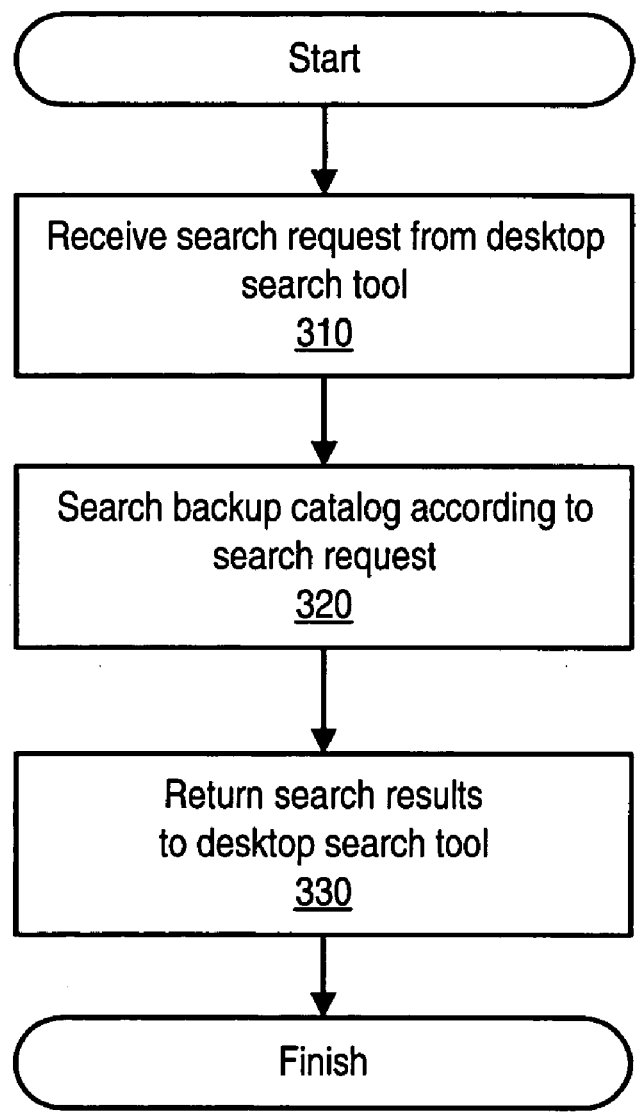
FIG. 3 is a flowchart of a method of operating a backup search agent, according to one embodiment of the present invention.

FIG. 3 illustrates a method of operating a backup search agent, according to one embodiment. The method begins at 310, when a search request is received from a desktop search tool. The search request corresponds to a search query initiated by an end user of a backup system. The search request can include keywords to search for; restrictions on file type and size; restrictions on file backup, creation, or access dates and/or times; and the like. In some embodiments, the search request is received via a network.

At 320, the backup catalog is searched according to the search request received at 310. The backup catalog can be searched directly (e.g., by searching a file storing the catalog, without communicating with the backup system) or indirectly. Indirectly searching the catalog can involve communicating search requests to the backup system and/or searching an index that corresponds to the catalog.

If, for example, the search request indicates that the end user if searching for backed-up files that contain the keyword "landscaping" that were created before Sep. 6, 2005, the catalog can be indirectly searched by searching the index for files that include the keyword landscaping. If the index also indexes metadata (obtained from the catalog), the index can be searched for files that were created before Sep. 6, 2005. Otherwise, the catalog can be searched (either directly or via the backup system) for this information. A list of files, if any, that satisfy both queries can be generated. This list of files can also include metadata (obtained from the index) associated with each identified file.

At 330, the search results, if any, obtained by searching the catalog are returned to the desktop search tool. These search results are returned in a format that is accepted by the desktop search tool. For example, in one embodiment, the search results are returned in the form of web pages. In another embodiment, the search results are returned in a format that allows the desktop search tool to display the backup search agent's search results in combination with search results returned by other search agents. It is noted that other operations can be included instead of and/or in addition to those operations shown in FIG. 3.

Figure 4:
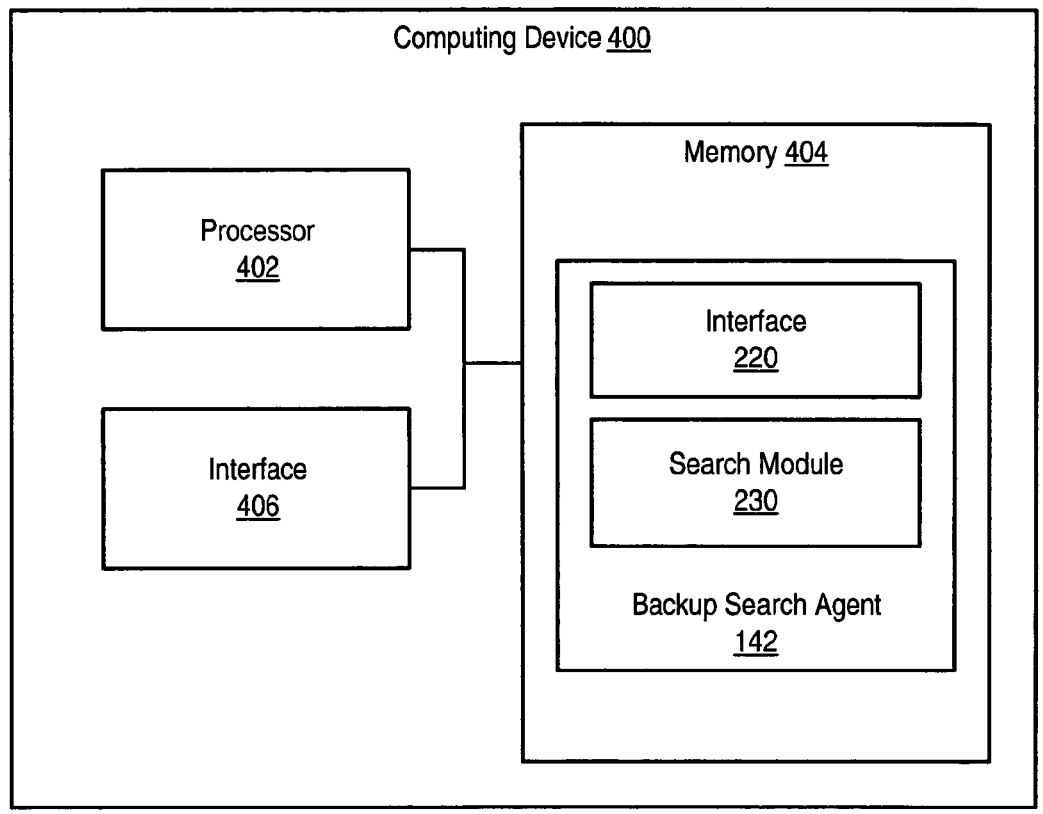
FIG. 4 is a block diagram of a computing system, according to one embodiment of the present invention.

FIG. 4 is a block diagram of a computing device 400 that implements a backup search agent 142 of FIGS. 1 and 2. In one embodiment, computing device 400 is used to implement search server 100(4) of FIG. 1. FIG. 4 illustrates how backup search agent 142 can be implemented in software.

As illustrated, computing device 400 includes one or more processors 402 (e.g., microprocessors, PLDs (Programmable Logic Devices), or ASICs (Application Specific Integrated Circuits)) configured to execute program instructions stored in memory 404. Memory 404 can include various types of RAM (Random Access Memory), ROM (Read Only Memory), Flash memory, MEMS (Micro Electro-Mechanical Systems) memory, and the like. Computing device 400 also includes one or more interfaces 406. Processor 402, memory 404, and interface 406 are coupled to send and receive data and control signals by a bus or other interconnect.

Interface(s) 406 can include an interface to a storage device (e.g., if all or part of an index or backup catalog is stored locally by backup search agent 142). Interface(s) 406 can also include an interface to a network (e.g., network 102 of FIG. 1) for use in communicating with a desktop search tool and/or catalog (e.g., if a distributed system, as shown in FIG. 1, is being implemented).

The program instructions and data implementing backup search agent 142 can be stored on various computer readable media such as memory 404. In some embodiments, such software is stored on a computer readable medium such as a CD (Compact Disc), DVD (Digital Versatile Disc), hard disk, optical disk, tape device, floppy disk, and the like). In order be executed by processor 402, the instructions and data implementing backup search agent 142 are loaded into memory 404 from the other computer readable medium. The instructions and/or data can also be transferred to computing device 400 for storage in memory 404 via a network such as the Internet or upon a carrier medium. In some embodiments, a computer readable medium is a carrier medium such as a network and/or a wireless link upon which signals such as electrical, electromagnetic, or digital signals, on which the data and instructions implementing backup search agent 142 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a search request from a desktop search tool, wherein
      the desktop search tool is configured to transmit the search request,
      the desktop search tool is configured for use by an end user of a backup system,
      the desktop search tool is a third-party search tool that is not part of the backup system, and
      the third-party search tool is provided by a different software vendor than the backup system;
   searching a backup catalog in response to the search request, wherein
      the searching comprises transferring a portion of an index corresponding to the backup catalog into local cache corresponding to a backup search agent, wherein
         the index identifies content included in one or more files identified in the backup catalog, and the transferring is performed by the backup search agent,
      the searching comprises searching the portion of the index, and
      the backup catalog is maintained in a proprietary format by the backup system and identifies a respective time associated with each of a plurality of files; and
   providing a result of searching the backup catalog to the desktop search tool, wherein the receiving, the searching, and the providing are performed by the backup search agent and the backup search agent is coupled to communicate with the desktop search tool and the backup system, the backup search agent directly accesses the backup catalog and interprets information in the backup catalog, the backup search agent is registered for communication with the desktop search tool, and the backup search agent formats the result for the desktop search tool.

2. The method of claim 1, wherein the searching the backup catalog comprises searching only a portion of the backup catalog, and the portion of the backup catalog identifies data that the end user has permission to access.

3. The method of claim 2, wherein the result of searching the backup catalog comprises:
 information identifying one or more versions of a file, and
 information identifying when each of the one or more versions of the file were backed up.

4. The method of claim 3, wherein the result of searching the backup catalog further comprises:
 information identifying a backup device on which each of the one or more versions of the file is stored.

5. The method of claim 3, further comprising:

displaying the result of searching the backup catalog to the end user; and displaying, to the end user, an option to restore each of the one or more versions of the file from a backup device.

6. The method of claim 1, wherein the receiving the search request comprises at least one of: receiving a keyword query, receiving a date range, and receiving a file type identifier.

7. The method of claim 1, wherein the desktop search tool is configured to provide an interface for the end user to search a plurality of sets of information, wherein the plurality of sets of information includes one or more sets of information other than the backup system.

8. A system comprising a processor and a memory, wherein the memory stores program instructions executable by the processor to implement a backup search agent, wherein the backup search agent is configured to be registered for communication with a desktop search tool, the backup search agent comprises:
 an interface to the desktop search tool, wherein
  the interface is configured to receive a search request sent by the desktop search tool, wherein the search request is initiated by an end user of a backup system,
  the desktop search tool is a third-party search tool that is not part of the backup system, and
  the third-party search tool is provided by a different software vendor than the backup system; and
 a search module coupled to the interface, wherein
  the search module is configured to transfer a portion of an index corresponding to the backup catalog into local cache corresponding to the backup search agent, wherein
   the index identifies content included in one or more files identified in the backup catalog,
  the search module is configured to search the portion of the index,
  the search module is configured to search a backup catalog maintained in a proprietary format by the backup system, in response to the interface receiving the search request,
  the search module is configured to directly access the backup catalog and interpret information in the backup catalog,
  the search module is configured to format a result of the search for the desktop search tool, and
  the backup catalog identifies a respective time associated with each of a plurality of files.

9. The system of claim 8, wherein the search module is configured to search only a portion of the backup catalog, and the portion of the backup catalog identifies data that the end user has permission to access.

10. The system of claim 9, wherein the interface is configured to send a result of searching the backup catalog to the desktop search tool, and a result of searching the backup catalog comprises at least one of:
 information identifying one or more versions of a file,
 information identifying when each of the one or more versions of the file were backed up, and
 information identifying a backup device on which each of the one or more versions of the file is stored.

11. The system of claim 10, further comprising:

a user interface, wherein
 the user interface is configured to display the result of searching the backup catalog to the end user, and
 the user interface is configured to display, to the end user, an option to restore each of the one or more versions of the file from a backup device.

12. The system of claim 8, wherein the search module is configured to search the backup catalog by searching an index corresponding to the backup catalog, the index identifies content included in one or more files identified in the backup catalog, and a portion of the index is locally cached by the backup agent.

13. A computer readable storage medium comprising program instructions executable to implement a backup search agent coupled to communicate with a desktop search tool and a backup system, wherein the backup search agent is configured to:

receive a search request from the desktop search tool, wherein
 the desktop search tool is configured to transmit the search request,
 the desktop search tool is configured for use by an end user of the backup system,
 the desktop search tool is a third-party search tool that is not part of the backup system, and
 the third-party search tool is provided by a different software vendor than the backup system;

search a backup catalog in response to the search request, wherein
 the searching comprises transferring a portion of an index corresponding to the backup catalog into local cache corresponding to the backup search agent, wherein
  the index identifies content included in one or more files identified in the backup catalog, and the transferring is performed by the backup search agent,
 the searching comprises searching the portion of the index, and the backup catalog is maintained in a proprietary format by the backup system and identifies a respective time associated with each of a plurality of files;

provide a result of searching the backup catalog to the desktop search tool;

directly access the backup catalog and interpret information in the backup catalog;

register for communication with the desktop search tool, and format the result for the desktop search tool.

14. The computer readable storage medium of claim 13, wherein searching the backup catalog comprises searching only a portion of the backup catalog, and the portion of the backup catalog identifies data that the end user has permission to access.

15. The computer readable storage medium of claim 14, wherein the result of searching the backup catalog comprises at least one of:

information identifying one or more versions of a file, information identifying when each of the one or more versions of the file were backed up, and information identifying a backup device on which each of the one or more versions of the file is stored.

16. The computer readable storage medium of claim 15, wherein the backup search agent is further configured to:

display, to the end user, an option to restore each of the one or more versions of the file from a backup device.

17. A system comprising:

a processor; computer readable storage medium;

means for executing program instructions stored in memory;

means for storing a backup catalog;

means for receiving a search request from a desktop search tool, wherein the desktop search tool is configured to transmit the search request, the desktop search tool is configured for use by an end user of a backup system, the desktop search tool is a third-party search tool that is not part of the backup system, and the third-party search tool is provided by a different software vendor than the backup system;

means for searching a backup catalog in response to the search request, wherein the searching comprises transferring a portion of an index corresponding to the backup catalog into local cache corresponding to the means for searching, wherein the index identifies content included in one or more files identified in the backup catalog, and the transferring is performed by the means for searching, the searching comprises searching the portion of the index, and the backup catalog is maintained in a proprietary format by the backup system and identifies a respective time associated with each of a plurality of files;

means for providing a result of searching the backup catalog to the desktop search tool;

means for directly accessing the backup catalog and interpreting information in the backup catalog;

means for registering for communication with the desktop search tool; and means for formatting the result for the desktop search tool.

18. The system of claim 17, wherein searching the backup catalog comprises searching only a portion of the backup catalog, and the portion of the backup catalog identifies data that the end user has permission to access.

19. The system of claim 18, wherein the result of searching the backup catalog comprises at least one of:

information identifying one or more versions of a file, information identifying when each of the one or more versions of the file were backed up, and information identifying a backup device on which each of the one or more versions of the file is stored.

20. The system of claim 19, further comprising:

means for displaying, to the end user, an option to restore each of the one or more versions of the file from a backup device.

* * * * *